(12) United States Patent
Kolberg et al.

(10) Patent No.: US 8,530,804 B2
(45) Date of Patent: Sep. 10, 2013

(54) METHOD AND DEVICE FOR PRODUCING GLASS PRODUCTS FROM A GLASS MELT

(75) Inventors: Uwe Kolberg, Mainz (DE); Sybill Nuettgens, Frankfurt (DE); Thomas Kirsch, Mainz (DE); Andreas Gross, Undenheim (DE); Ernst-Walter Schaefer, Welgesheim (DE)

(73) Assignee: Schott AG, Mainz (DE)

( * ) Notice: Subject to any disclaimer, the term of this patent is extended or adjusted under 35 U.S.C. 154(b) by 461 days.

(21) Appl. No.: 12/834,221

(22) Filed: Jul. 12, 2010

(65) Prior Publication Data
US 2011/0011849 A1    Jan. 20, 2011

(30) Foreign Application Priority Data
Jul. 15, 2009    (DE) .................. 10 2009 033 502

(51) Int. Cl.
*H05B 6/10* (2006.01)
(52) U.S. Cl.
USPC ........ 219/618; 219/677; 65/134.1; 65/374.13
(58) Field of Classification Search
USPC ................. 219/602, 618, 677; 373/156, 158; 65/134.1, 374.13
See application file for complete search history.

(56) References Cited

U.S. PATENT DOCUMENTS

| | | | | |
|---|---|---|---|---|
| 3,723,631 A | * | 3/1973 | Cichy et al. ...................... 373/72 |
| 4,719,187 A | * | 1/1988 | Bardhan et al. ............... 501/98.5 |
| 4,775,565 A | * | 10/1988 | Kubota et al. ................. 428/34.6 |
| 4,796,077 A | * | 1/1989 | Takeda et al. .................. 257/705 |
| 5,283,805 A | * | 2/1994 | Kawano et al. ................ 373/156 |
| 5,319,671 A | * | 6/1994 | Hopf ............................. 373/145 |
| 5,668,827 A | * | 9/1997 | Goy ................................ 373/156 |
| 6,214,284 B1 | * | 4/2001 | Soudarev et al. .............. 264/642 |
| 6,817,212 B1 | * | 11/2004 | Romer et al. .............. 65/374.12 |
| 6,889,527 B1 | * | 5/2005 | Romer et al. ................... 65/347 |
| 7,444,837 B2 | | 11/2008 | Romer et al. |
| 2006/0050762 A1 | * | 3/2006 | Richardson .................. 373/150 |

FOREIGN PATENT DOCUMENTS

| | | |
|---|---|---|
| DE | 10244807 A1 | 7/2003 |
| DE | 10 2008 004 739 A1 | 7/2009 |
| EP | 1 275 619 A2 | 1/2003 |
| WO | WO2006088339 * | 8/2006 |

OTHER PUBLICATIONS

German Office Action dated Mar. 15, 2010 for corresponding German Patent Application No. 10 2009 033 502.1-45 (w/ English translation).

* cited by examiner

*Primary Examiner* — Caridad Everhart
(74) *Attorney, Agent, or Firm* — Ohlandt, Greeley, Ruggiero & Perle, LLP

(57) ABSTRACT

A method and a device for the continuous production of glass and glass ceramic products from a glass melt is provided, which simplifies the changing between two kinds of glass. The device includes a melting crucible and an induction coil, which preferably extends around the melting crucible in order to heat a glass melt by means of an induction field generated by the induction coil. The wall elements, which form the side wall of the crucible, have cooling channels, through which a cooling fluid can be conducted, so that the glass melt solidifies on the side wall and forms a skull layer. The interior side of the wall elements is formed at least in part by an aluminum nitride-containing ceramic.

19 Claims, 4 Drawing Sheets

METHOD AND DEVICE FOR PRODUCING GLASS PRODUCTS FROM A GLASS MELT

CROSS REFERENCE TO RELATED APPLICATIONS

This application claims benefit under 35 U.S.C. §119(a) of German Patent Application No.10 2009 033 502.1, filed Jul. 15, 2009, the entire contents of which are incorporated herein by reference.

BACKGROUND OF THE INVENTION

1. Field of the Invention

The invention relates to a method and a device for the continuous production of glass and glass ceramic products from a glass melt.

2. Description of Related Art

Glass products, such as, in particular, high-purity glasses and glass ceramics, are generally produced in melt vessels made from noble metals, such as platinum or platinum alloys, as well as from silica glass. However, these have known drawbacks, such as, for example, a yellowing due to ionic platinum entrained in the glass melt and/or scattering effects at entrained platinum particles as well as streaks and other inhomogeneities due to dissolution of the silica glass crucible material in the glass melt.

In addition, glass melts for high-purity glasses and glass ceramics are often quite aggressive toward the crucible materials used in each case. As a result, wear of the equipment and a premature end of the production occur.

Known from DE 102 44 807 A1 is a remedy for these drawbacks through the use of a so-called skull melting unit, which comprises a multi-turn coil constructed from water-cooled copper pipes and a skull crucible constituted of pipes made of metal (Cu, Al, Ni—Cr—Fe alloy, or possibly Pt) and having a palisade-like arrangement parallel to the coil axis, which are referred to also as "cold fingers." The pipes of the skull crucible must have a minimum spacing in order to enable the applied high-frequency electric field to penetrate into the fluid glass present in the skull crucible and to heat it further by direct in-coupling with the creation of eddy currents. A crust of solidified/crystallized intrinsic material forms between the cooled metal crucible and the hot glass. This has the function of protecting the metallic crucible against corrosive glass attack and of protecting the glass against the entrainement of impurities from the metal and forms a leakage barrier and effects a reduction of the heat losses from the glass to the cooling medium.

These functions are fulfilled by the cited melting method. Furthermore, it is possible to produce glass products having good quality. However, the melting method has the drawbacks presented below.

The high operating voltages of greater than 1000 V result repeatedly in flashovers, mostly between the coil and the crucible and especially in dusty surroundings. This can result in long-lasting interruptions in operation and thus lead to high production costs.

The high voltages pose a potential source of danger to the persons operating the unit.

As a result, idle powers of 10 to 20% of the total power are created, in particular due to the voltage drop at the crucible.

In addition, in the metallic pipes having a palisade-like arrangement, which form the side walls of the crucible, as well as in the metallic bottom, energy is absorbed or reflected and is no longer available for the melting process. In order to enable at all a heating of the melt by means of the applied high-frequency electric field, it is necessary to ensure an energy input that is as efficient as possible. Losses in the metallic materials that belong to the melting unit must be minimized to the greatest degree possible. Opposed to the use of ceramics in the melting unit, however, is the high corrosiveness toward ceramic materials that many glass and glass ceramic melts display. If ceramics made of refractory components are used for the melting unit, therefore, there is no adequate leakage protection. In addition, the dissolution products of the ceramic linings result in streaks, bubbles, discolorations, and other flaws in the glass, which can substantially impair the quality of the product.

Another problem posed by melt crucibles in general and thus also by skull crucibles is changing the glass composition in a continuously operating unit. A conventional approach consists in simply changing the composition of the batch that is introduced during the course of the melting. In doing so, there exists the problem that the glass produced after the change in the batch composition only gradually assumes the desired composition. In this case, at least insofar as the difference in the composition is appreciable for the desired glass properties, substantial quantities of produced glass having a mixed composition cannot be used. In addition, the unproductive period of time until the attainment of the desired glass composition leads to increased production costs.

If the crucible is cooled, on the other hand, the solidified glass residues must be removed. However, these adhere to the surfaces of the crucible that are in contact with the melt. If the glass is knocked off, the crucible may be damaged.

Therefore, the problem of the invention is to simplify changing between the two kinds of glass.

BRIEF SUMMARY OF THE INVENTION

Provided in accordance therewith is a melting device for glasses, which comprises a melting crucible and an induction coil, which preferably extends around the melting crucible in order to heat a glass melt by means of an induction field generated by the induction coil, and wall elements, which form the side wall of the crucible and have cooling channels, through which a cooling fluid can be conducted, so that the glass melt solidifies on the side wall and forms a skull layer, wherein the interior side of the wall elements is formed at least in part by an aluminum nitride-containing ceramic, in particular an aluminum nitride ceramic.

In accordance with the invention, therefore, the melt contact surface of the lateral interior side wall of the crucible is formed at least in part by an aluminum nitride ceramic or an aluminum nitride-containing ceramic. Aluminum nitride has the advantage that this material, on the one hand, is electrically insulating and, on the other hand, also has good thermal conductivity. On account of the good thermal conductivity, the crucible side wall can even be made entirely of aluminum nitride ceramic. In other words, the otherwise conventional metal pipes for skull crucibles are replaced by aluminum nitride-containing ceramic elements, so that the crucible has wall elements made of aluminum nitride-containing ceramic.

According to one embodiment of the invention, the wall elements can be constructed in the form of adjacently running pipes, the interiors of which each form a cooling channel through which the cooling fluid is conducted.

Alternatively or additionally, it is possible to provide plate-shaped side wall elements for which at least the interior side has the aluminum nitride-containing ceramic.

Because aluminum nitride is also electrically insulating, the field of the induction coil is influenced not at all or only insignificantly by the wall elements, provided that the wall elements are made of electrically insulating material, in particular completely made of aluminum nitride-containing ceramic. The above-mentioned problems, which arise on account of the conventional metal pipe construction of the skull crucible are accordingly eliminated.

On account of the advantages of the material, it is also possible to provide a bottom element of the crucible for which at least the interior side is made of an aluminum nitride-containing material.

Preferably, the cooling of the crucible takes place with water.

In order to obtain a sufficiently good thermal conductivity, it is particularly preferred to have the interior side of the wall elements be formed by an aluminum nitride-containing ceramic that contains aluminum nitride in a preponderant molar proportion. Preferably, the molar proportion of aluminum nitride in the ceramic is at least 70%. In an enhancement of the invention, then, the aluminum nitride-containing ceramic of the melt contact surface can contain, if appropriate, boron nitride as an additional component. Boron nitride also has a good, although lower thermal conductivity. However, the admixture of boron nitride results in a more facile processing of the material, which is advantageous for the production costs of the melting device.

Regardless of whether a pure aluminum nitride ceramic is employed or else admixtures, such as, for instance, the above-mentioned boron nitride, it is advantageous when the ceramic has a thermal conductivity of at least 85 W/m·K, measured at 20° C. In the case of pure aluminum nitride ceramics or those with small admixtures of, for instance, boron nitride, it is possible even to attain values of the thermal conductivity of greater than 130 W/m·K.

In order to ensure a nearly unhindered penetration of the electromagnetic field, it is further advantageous when the electrical conductivity of the aluminum nitride-containing ceramic at a temperature of 20° C. is less than $10^{-8}$ S/m. The electrical conductivity of pure aluminum nitride ceramic lies, for example, markedly below this value.

It has been shown that, as a material itself, aluminum nitride has a high long-term stability even in many aggressive melts. Therefore, the melting device is particularly preferably constructed for the continuous melting of glasses, the device having a glass melt outlet, through which, in operation, glass melt can be continuously discharged, as well as an input device for the input of melting charge continuously or in batches.

In addition, a special property of aluminum nitride as a melt contact material is that glass does not adhere to it or hardly adheres to it. In general, solidified glass melts detach, even by themselves, from the ceramic. This results in the particular advantage that a crucible can be freed of glass residue in a very simple manner after emptying or cooling. This thus entails the possibility of circumventing the complicated and cost-intensive remelting in continuously operating melt crucibles, in which a first melting composition is replaced by a second one in ongoing operation, with the composition of the molten glass being accordingly changed gradually.

Provided for this purpose, in accordance with the invention, is a method for the melting of glasses, in particular by means of a device such as described above, in which, continuously or in batches, melting charge is input into a crucible for a first composition and the melting charge is melted in a glass melt present therein, with the melt being heated by an electromagnetic field generated by an induction coil, wherein the side wall of the crucible are simultaneously cooled by means of conducting a cooling fluid through cooling channels, so that a skull layer is maintained on the crucible side wall, —and wherein melt is continuously drawn out of the crucible, and wherein at least a part of the interior side of the crucible to which the skull layer adheres is formed from an aluminum nitride-containing ceramic, and changing of the composition of the glass melt.

The changing of the composition of the glass melt comprises the further steps cooling of the melt or of residues of the melt, with the cooled melt detaching from the interior side of the side wall formed by the aluminum nitride-containing ceramic, removal of the cooled melt, pouring in a melting charge of a second glass composition, melting of a region of the poured-in melting charge, in-coupling of electromagnetic energy into the melted region of the melting charge by means of the induction coil and further heating of the melting charge, upon which the remaining melting charge is melted as well and a new skull layer is formed at the cooled crucible side wall, and continuation of the continuous melting process with the second glass composition by inputting melting charge continuously or in batches and discharging the fused glass continuously.

In general, during the changing of the glass melt, it is naturally advantageous to empty the crucible before the melt is cooled or else before the alternating field of the induction coil is switched off.

Typically, the glass melt remaining in the crucible can be detached, without anything further, that is, also without the use of chisels or similar tools, from the melt contact surfaces made of aluminum nitride-containing ceramic, because the low surface energy of aluminum nitride prevents the adhesion of glass. This also applies to a melt contact surface containing an admixture of boron nitride, that is, to a boron nitride-aluminum nitride ceramic, because boron nitride also has a low surface energy.

Particularly suitable glasses for the method according to the invention or for the device according to the invention are preferably arsenic-free and alkali-free aluminum silicate glasses, fluorophosphate glasses, and lanthanum borate glasses.

In addition, aluminum nitride still exhibits good antifriction properties toward these glasses. In particular, the attack of the melt on the aluminum nitride is low if the cooling should fail and the skull layer melt.

In contrast, in the case of some other glasses, such as, for instance, an arsenic-containing glass for optical fibers, there occurs a stronger attack of the melts with substantial bubble formation. Obviously, however, such glasses can also be used, provided that a permanent cooling is ensured.

In any case, it is also possible to switch between very diverse glasses, such as, for instance, between the above-mentioned types of glass, without anything further, because the residues of the melt can be removed in an easy and also thus practically residue-free manner from the crucible.

Found after a certain operating time in the case of some glasses, such as the aforementioned arsenic-containing glass of optical fibers, lanthanum borate glass, and fluorophosphate glass is the creation of a crystallized layer from the melt on the aluminum nitride-containing ceramic. Here, it has been shown that the crystalline layer can likewise be easily removed as a solidified glass layer and also without any noticeable attack on the ceramic.

The remelting or changing between two different glass compositions and the cleaning of the crucible may also be facilitated particularly when the circumference of the inner crucible side wall increases toward the bottom or toward the bottom element and the bottom and side wall can be taken apart. In other words, on account of the enlarged circumference, the inner crucible side wall has, at least in the region adjoining its bottom edge, an enlarged cross section or at least a cross-sectional area that is enlarged toward the bottom. For example, the crucible can be enlarged in a bell shape or conically.

The changing of the melt composition can take place as follows. As discussed above, the melt remaining in the crucible is first cooled. The removal of the cooled melt then takes place simply by separating the bottom and side wall from each other in the vertical direction, for example by moving the bottom downward or the side wall upward. As a result of the fact that the circumference of the side wall is enlarged toward the bottom, it is achieved that the solidified melt does not adhere to the side wall, but rather lies on the bottom. The solidified glass melt residues can then be removed in a very simple manner on the exposed bottom, because the melt is no longer surrounded by the annular side wall. For example, for this purpose, the melt can be pushed to the side from the bottom or dumped out. After removal, the bottom and side wall are reassembled and the melting charge of the second glass composition is poured in.

Aluminum nitride has proven, moreover, to be particularly suited for long operating times in long-term operation due to its only slight attack of the melt on the cooled side walls. Accordingly, there can be long time intervals between the change in the melt composition. Thus, in long-term operation, the crucible can have a service life of at least two months or be operated for at least two months in long-term operation. Even appreciably longer service lives are possible using the crucible according to the invention. Preferably, the operating time is at least half a year. A briefly interrupted operation due to the above-described changing of the glass composition, for instance, is also regarded as long-term operation in this case, as long as the crucible is operated at least 85% of the time in melting operation within the operating period.

Advantageously, nitride ceramics or, in general, aluminum nitride-containing ceramics having low oxygen contents are used, because the thermal conductivity of aluminum nitride greatly depends on the oxygen content. However, oxygen is a typical constituent of aluminum nitride ceramics. With increasing oxygen content, the thermal conductivity decreases asymptotically. For this reason, aluminum nitride ceramics having an oxygen content of less than 2 mol % is preferably used.

Aluminum nitride is, moreover, relatively easily oxidized, with the oxidation rate increasing linearly with the temperature. An adequate cooling of the aluminum nitride-containing material is important, therefore, in order to prevent the oxidation, on the one hand, by atmospheric oxygen and, on the other hand, above all by oxygen from the melt. Once this process commences, it leads to a self-reinforcing process: the increased temperature leads to enhanced oxidation and enhanced oxidation lowers the thermal conductivity of the material and thus leads, in turn, to increased temperatures. In particular, in a particularly preferred enhancement of the invention, the interior side of the wall elements is cooled such that its surface temperature on the side facing the melt, or on its interior side, is less than 750° C., preferably less than 500° C. If, by contrast, aluminum nitride ceramics having the aforementioned low oxygen content are employed as side wall material, such a self-reinforcing process is effectively suppressed over a long time and thus long service lives are achieved.

The invention will be explained in more detail below on the basis of exemplary embodiments and with reference to the attached drawings. Here, identical reference signs refer to identical or corresponding elements.

DETAILED DESCRIPTION OF THE INVENTION

Figure 1:
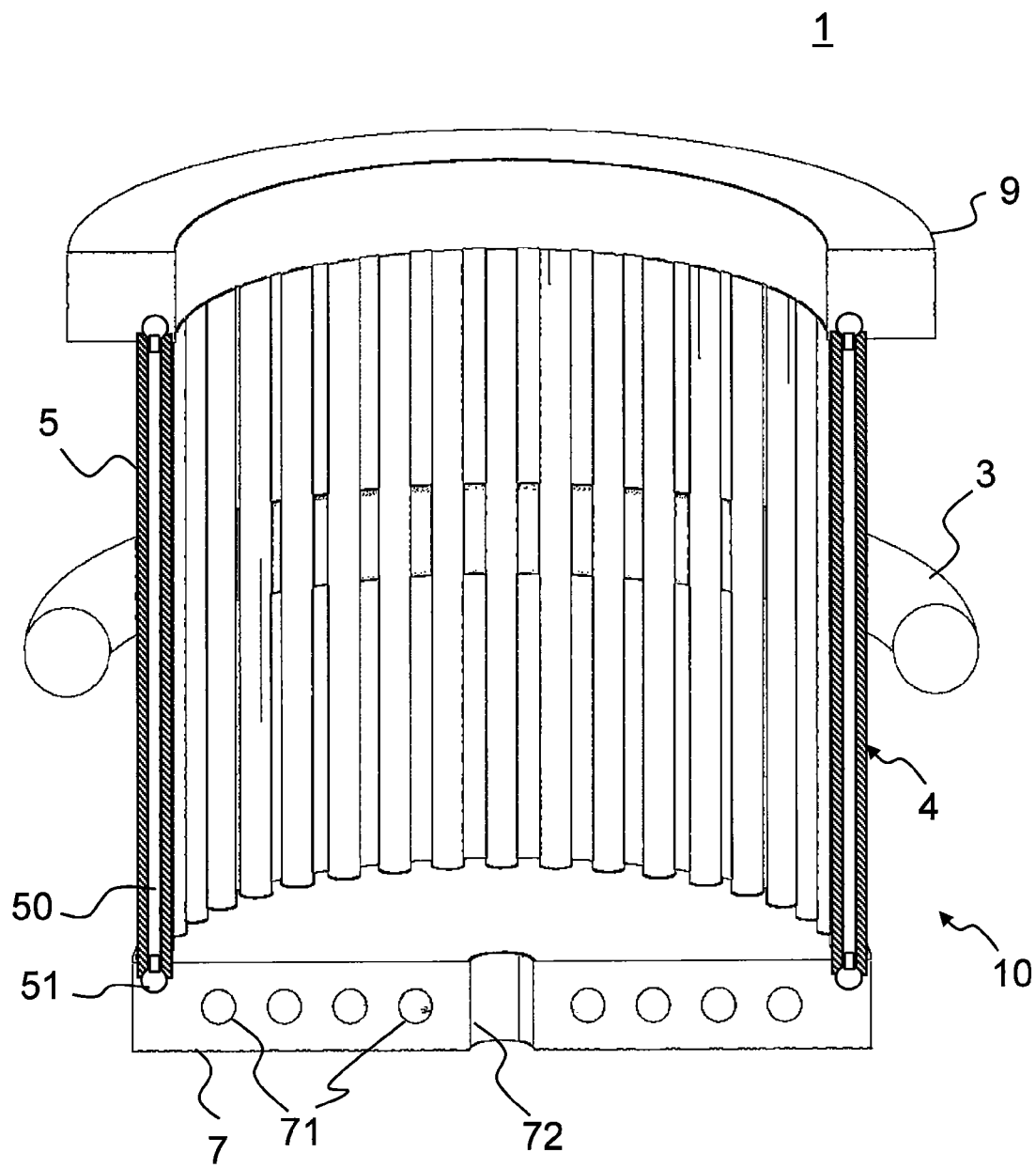
FIG. 1, in cut-out view, a first exemplary embodiment of a device according to the invention, FIG. 2, a view of parts of a device according to a second exemplary embodiment, FIG. 3, a cross section through a cold finger made of aluminum nitride ceramic for testing the properties of the ceramic in various glass melts, and FIGS. 4 to 6, steps of the method for changing the melt composition.

FIG. 1 shows a cut-out view of a melting device 1 for glasses according to the invention having a melting crucible 10.

An induction coil 3 extends annularly around the melting crucible 10 in order to heat a glass melt by means of an induction field generated by the induction coil 3.

The side wall 4 of the crucible 10 is formed by wall elements in the form of pipes 5 made of an aluminum nitride-containing ceramic, preferably an aluminum nitride ceramic, optionally containing an admixture of boron nitride. Running in each of the pipes 5 is a cooling channel 50, through which cooling water is conducted during operation of the crucible, so that the glass melt solidifies on the side wall and forms a skull layer. The cooling channels 50 are connected to a common supply channel 51.

The pipes 5, made of aluminum nitride-containing ceramic, are electrically insulating. Accordingly, the electromagnetic alternating field of the induction coil 3 can penetrate freely into the melt. In contrast to the case of conventional skull crucibles for glass melts, which are constructed from metal pipes, no electrical currents are induced by the field in the pipes 5 of the side wall. The aluminum nitride-containing ceramic used for the pipes 5 has, furthermore, a thermal conductivity of at least 85 W/m·K and an electrical conductivity of less than $10^{-8}$ S/m at 20° C. Preferably, for this purpose, an aluminum nitride ceramic having an oxygen content of less than 2 mol % is used. In order to prevent oxidation of the aluminum nitride ceramic during operation of the crucible, the pipes 5 are additionally cooled so that their surface temperature remains at less than 750° C., preferably less than 500° C.

The bottom side of the crucible 10 is formed by a bottom element 7, which is likewise cooled via cooling channels 71. The bottom element 7, at least its interior side, is also preferably made of aluminum nitride-containing ceramic. If the bottom element 7, like the side wall, is also electrically insulating, the field of the coil 3 can penetrate completely unhindered into the melt. In this way, an appreciably improved efficiency of the melting device 1 is achieved.

The upper ends of the pipes 5 are fixed in place by means of a ring 9 made of, for example, Quarzal or another temperature-stable material. Provided in the example shown in FIG. 1 in the ring 9 and in the bottom part 7 are supply channels 51, through which the cooling water for the pipes 5 is supplied or discharged.

Additionally provided in the bottom part 7 is a discharge outlet 72. This outlet 72 is employed for constant discharge of the melt during continuous operation by means of a riser pipe connected to it, for instance, as well as for discharging the melt when the glass composition is changed.

Alternatively, a discharge outlet in the region of the melt surface can also be provided for discharging the melt. In this case, it is advantageous to provide a barrier, which is immersed in the melt, in front of the outlet, which prevents the introduced melting charge that has not yet melted from directly entering the outlet.

Figure 2:
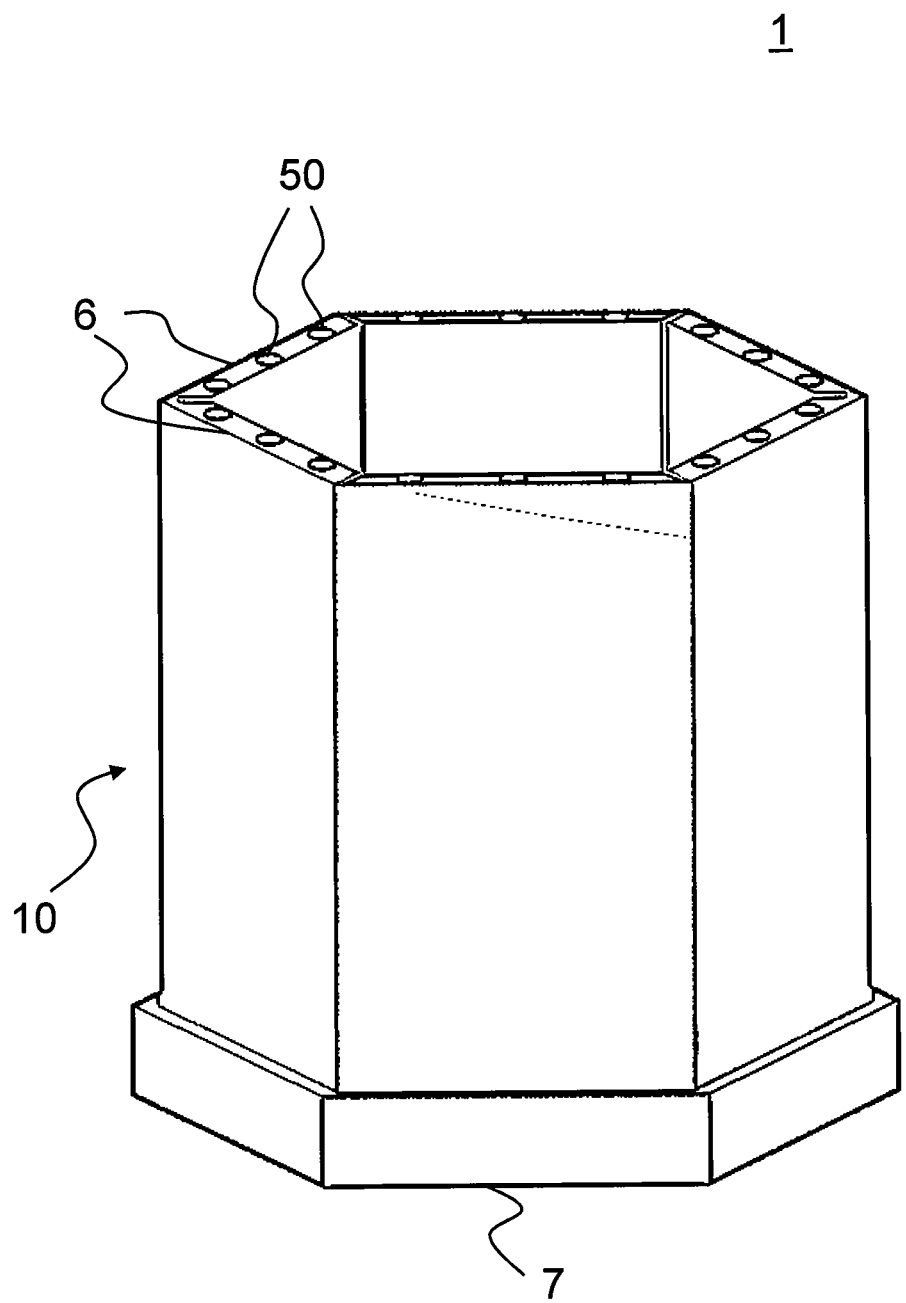

FIG. 2 shows parts of a device 1 according to a variant of the exemplary embodiment illustrated in FIG. 1. In this variant, the side wall of the crucible 10 is composed of plate-shaped elements 6 made of an aluminum nitride-containing ceramic. Provided in the plate-shaped elements 6 are also cooling channels 50, through which, during operation, cooling water is conducted in order to create a skull layer. Not illustrated are the induction coil and the optionally provided ring 9.

In the following, several tests with aluminum nitride as melt contact material for the aforementioned device will be described.

Figure 3:
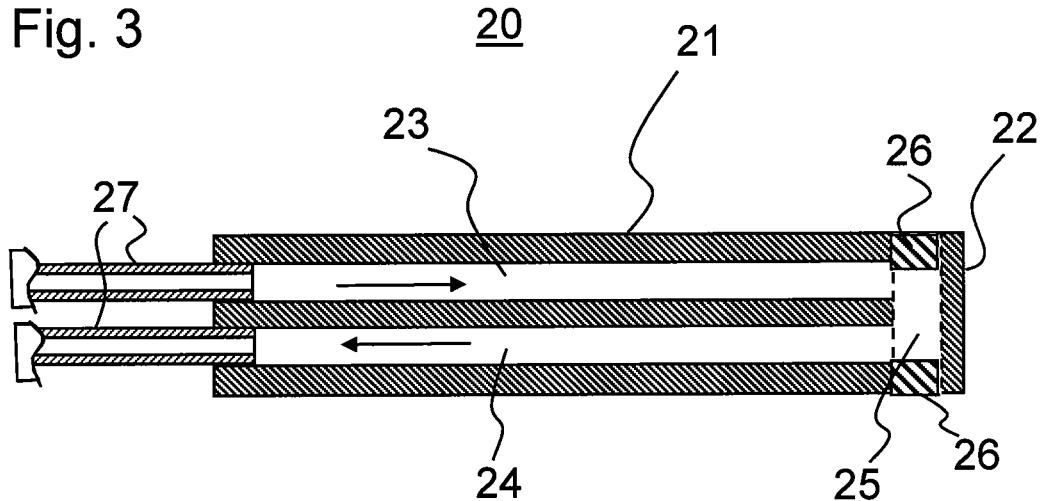

The suitability of aluminum nitride ceramic as melt contact material was tested using an arsenic-containing fiber glass (designation PW4), a fluorophosphate glass (designation N-PK52A), and a lanthanum borate glass (designation N-LaSF31A). Prepared for the test was a cooled finger made of aluminum nitride ceramic, such as illustrated in FIG. 3. Introduced in the finger 21 are two lengthwise bores 23, 24, which communicate with each other via a cross bore 25 at the end 22. The cross bore 25 is sealed off using two plugs 26. Attached to the lengthwise bores 23, 24 are copper pipes 27, through which cooling water is supplied and discharged. The flow direction is symbolized by the arrows in the lengthwise bores 23, 24.

The cold finger 20 was immersed at its end 22 in the glass melt, kept there during each test for about 24 hours, and then withdrawn.

The temperature of the melt of the arsenic-containing fiber glass was 1350° C. After the cold finger had been taken out of the melt, there was found a crystallized layer of melting material that was approximately 5 millimeters thick. However, the layer does not adhere firmly to the aluminum nitride ceramic.

The temperature of a lanthanum borate glass melt was about 1400° C. Found directly on the cold finger was a glass layer having a thickness of about 1-2 millimeters, which, in turn, was surrounded by a crystallized layer having a thickness of about 6 to 7 millimeters. These residues also could be detached from the melt without any problem.

Following storage in a fluorophosphate glass melt of about 900° C., only one glass layer was found on the cold finger. Accordingly, a crystallization was not observed. The glass layer could also be easily detached.

In none of the above-mentioned tests could any noticeable attack on the aluminum nitride ceramic by the melt be observed.

In order to test the attack by the melt, the cold finder was again stored for one week in the fluorophosphate glass melt. Even after one week, no noticeable attack by the melt could be observed.

Moreover, tests were carried out with an uncooled aluminum nitride ceramic object immersed in the melt in order to test the material attack during a failure of the cooling. In addition to the above-mentioned glass melts, the melt of an arsenic-free and alkali-free aluminum silicate glass (designation AF 37) was tested.

Observed in the 1400° C. hot melt of the arsenic-containing fiber glass was a strong reaction with bubble formation at the aluminum nitride ceramic object and an over-foaming of the melt, so that the test was discontinued after less than 15 minutes. The reaction is possibly due to the arsenic content.

If good antifriction properties are desired, the invention is therefore suitable, in particular, for the melting of arsenic-free or at least low-arsenic glasses. In terms of the invention, low arsenic means a glass having a content of $As_2O_3$ of less than 0.25 weight percent.

If the formation of a crystallized layer on the cooled ceramic is observed, this can also appreciably improve the antifriction properties, because the crystallized layer creates a shielding of the ceramic against the melt.

Observed in the 1350° C. hot melt of the lanthanum borate glass was, by contrast, only a slight reaction. Found here, however, was a strong attack of the Quarzal crucible used for the test, so that this test was discontinued after about 30 minutes. This confirms that the invention is also very well suited for aggressive melts.

No reaction was evident at first in the 950° C. hot melt of the fluorophosphate glass. Only after a while was a slight bubble formation found. Observed was a gradual uniform dissolution. The test was ended after approximately 150 minutes. Therefore, even though the aluminum nitride ceramic is slightly attacked by the melt, good antifriction properties are achieved in the case of fluorophosphate glasses without a destruction of a crucible having an aluminum nitride side wall.

Similar observations could be made also in the melt of an arsenic-free and alkali-free aluminosilicate glass, even at 1600° C. Found here, too, was only a slight reaction with slight bubble formation, so that the test could be ended without premature discontinuation after about 120 minutes.

Figure 4:
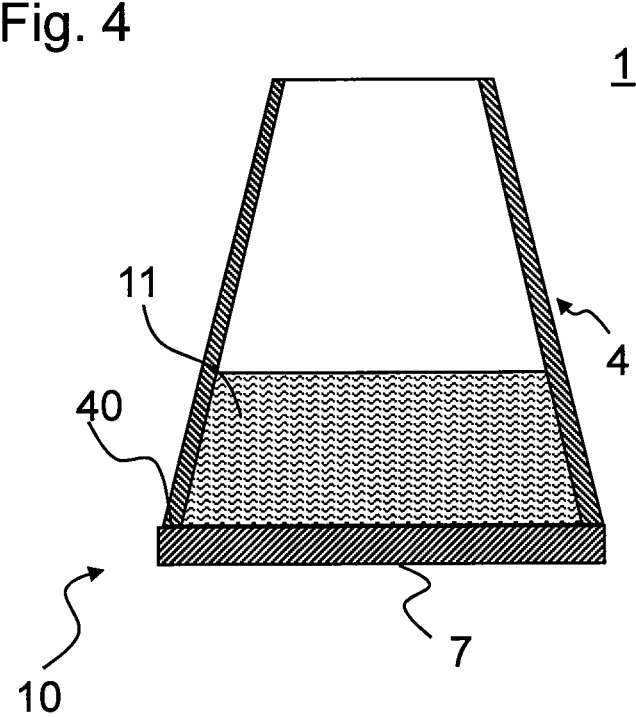
Figure 5:
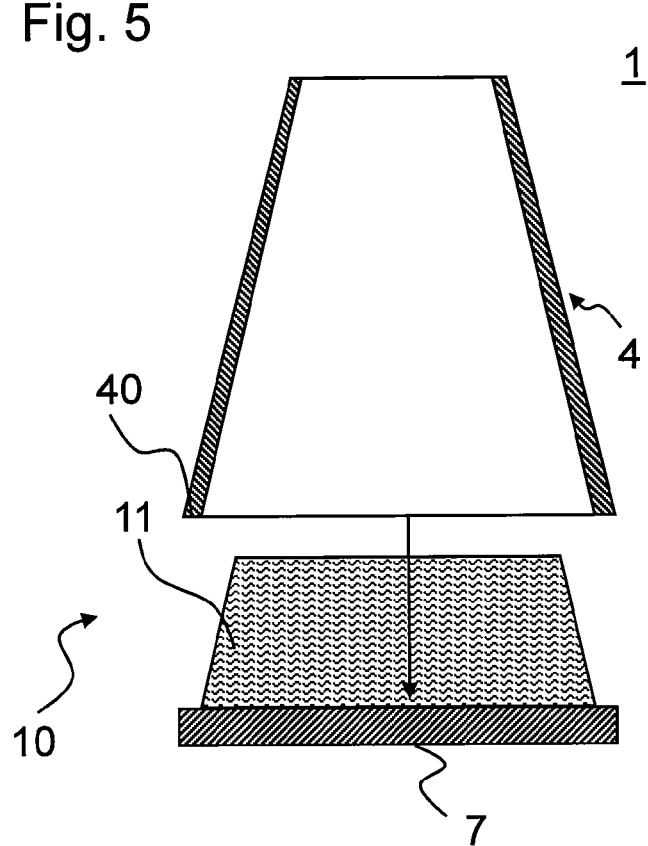
Figure 6:
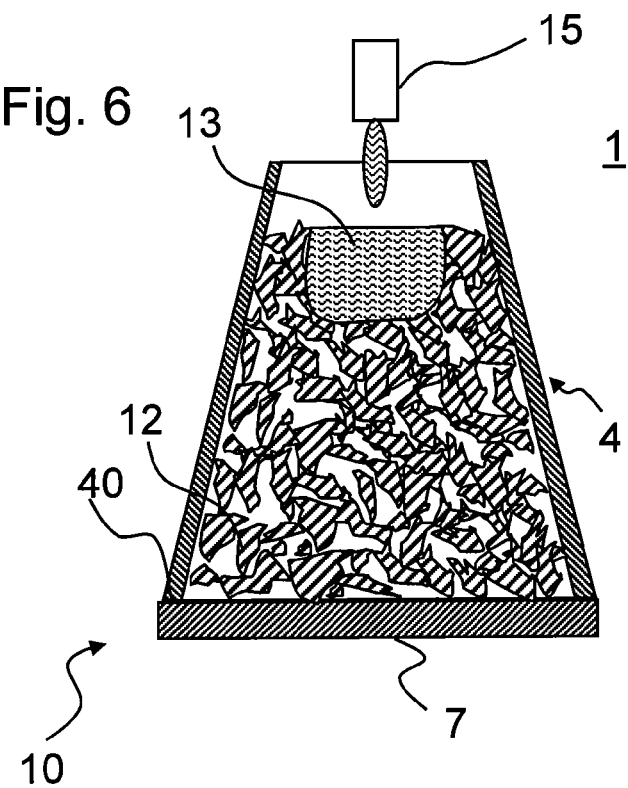

FIGS. 4 to 6 show steps of the method for changing the glass melt with a device that illustrates a variant of the exemplary embodiments illustrated in FIG. 1 and FIG. 2 and has a crucible side wall that enlarges in circumference toward the bottom. The device 1 in this case is illustrated schematically in cross section. The cooling channels in the bottom element 7 and in the side wall 4 are not illustrated for reasons of simplicity. The side wall 4 can be constructed, for example, from wall elements in the form of pipes 5, as shown in FIG. 1, or in the form of plate-shaped elements 6, as shown in FIG. 2. As can be seen on the basis of FIG. 4, the side wall 4 enlarges toward its lower edge 40. In other words, its circumference increases toward the bottom arranged at the lower edge 40. Moreover, the bottom elements 7 and side wall 4 are held in such a manner that they can be separated.

Initially, as illustrated in FIG. 4, the crucible 10 is still filled with melt 11 of a first composition. In order to change the melt, the melt 11 is initially cooled by switching off the induction voltage applied to the induction coil 3, which is not illustrated in FIG. 4. If necessary, the crucible 10 can be emptied prior to cooling, so that only residues of the melt filling still remain in the crucible 10. Therefore, in FIG. 4, the not fully filled crucible 10 is also illustrated. For emptying, it is possible to provide a discharge outlet in the bottom element 7, as in the example shown in FIG. 1.

Next, as shown in FIG. 5, bottom element 7 and side wall 4 are pulled apart in the vertical direction and thus spatially separated from each other. Because, on account of the aluminum nitride-containing ceramic of the interior side wall, the solidified melt detaches from the side wall 4, the melt does not adhere to the interior side of the wall, but rather remains lying on the bottom element 7. The melt 11 lying on the bottom element 7 is now accessible from the side and can be removed in a simple manner.

Next, as illustrated in FIG. 6, bottom element 7 and side wall 4 are placed back together, the crucible 10 is filled with bulk, solid melting charge 12 of a second glass composition, and the crucible is heated by means of a supplemental heating, such as, for example, a burner 15, so that, locally, a melt 13 of the second glass composition is formed. The melt 13 is then further heated inductively, so that the remaining bulk melting charge is fused. Subsequently, the continuous melting operation, in which the melting charge is input continuously or in batches, and continuously discharged, is continued with the second glass composition.

It is obvious to the skilled practitioner that the invention is not limited to the exemplary embodiments described above, but rather can be varied diversely within the scope of the following patent claims. In particular, the features of the exemplary embodiments can also be combined with one another. Thus, for example, plate-shaped wall elements made of aluminum nitride-containing ceramic, such as shown in FIG. 2, can be combined with pipe-shaped wall elements in accordance with the exemplary embodiment shown in FIG. 1.

What is claimed is:

1. A melting device for glasses, comprising:
   a melting crucible;
   an induction coil that extends around the melting crucible in order to heat a glass melt by means of an induction field generated by the induction coil; and
   wall elements that form the side wall of the melting crucible and have cooling channels through which a cooling fluid can be conducted so that the glass melt solidifies on the side wall and forms a skull layer,
   wherein the wall elements have an interior side formed at least in part by an aluminum nitride-containing ceramic, and
   wherein the wall elements are made of the aluminum nitride-containing ceramic.

2. The melting device according to claim 1, wherein the wall elements comprise adjacently running pipes each forming a separate cooling channel through which the cooling fluid is conducted.

3. The melting device according to claim 1, wherein the wall elements are plate-shaped having the interior side of the aluminum nitride-containing ceramic.

4. The melting device according to claim 1, wherein the cooling fluid is water.

5. The melting device according to claim 1, wherein the melting crucible has a bottom element having an interior side formed from an aluminum nitride-containing material.

6. The melting device according to claim 1, wherein the wall elements comprise an electrically insulating material.

7. The melting device according to claim 1, wherein the aluminum nitride-containing ceramic comprises at least 70% aluminum nitride.

8. The melting device according to claim 1, wherein the aluminum nitride-containing ceramic comprises boron nitride.

9. The melting device according to claim 1, further comprises:
   an input device for the input of melting charge continuously or in batches into the melting crucible; and
   a glass melt discharge outlet, through which, during operation, glass melt can be discharged continuously.

10. The melting device according to claim 1, wherein the aluminum nitride-containing ceramic has a thermal conductivity of at least 85 W/m·K at 20° C.

11. The melting device according to claim 1, wherein the aluminum nitride-containing ceramic has an electrical conductivity of less than $10^{-8}$ S/m at a temperature of 20° C.

12. The melting device according to claim 1, wherein the melting crucible further comprises an inner crucible side wall having a circumference that enlarges toward a bottom that can be separated from the side wall.

13. The melting device according to claim 1, wherein the interior side of the wall elements is formed at least in part by an aluminum nitride ceramic having an oxygen content of less than 2 mol %.

14. A method for the melting of glasses, continuously or in batches, comprising:
   inputting a first melting charge for a first glass composition into a crucible;
   melting the first melting charge in a first glass melt already present in the crucible by heating the first melting charge and the first glass melt with an electromagnetic field generated by an induction coil;
   conducting a cooling fluid through cooling channels to, simultaneously with the melting, cool a side wall of the crucible so that a skull layer of the first glass melt is maintained on the side wall;
   drawing the first glass melt continuously out of the crucible, wherein the side wall has an interior having at least a part to which the skull layer adheres formed by an aluminum nitride-containing ceramic;
   cooling the first glass melt until the first glass melt detaches from the interior of the side wall;
   removing the cooled first glass melt;
   pouring in a second melting charge for a second glass composition into the crucible;
   melting a region of the second melting charge;
   coupling-in electromagnetic energy into the region of the second melting charge by an induction coil to further melt remaining regions of the second melting charge thereby forming a second glass melt;
   conducting the cooling fluid through cooling channels to, simultaneously with the melting, cool the side wall of the crucible so that a skull layer of the second glass melt is maintained on the side wall; and
   inputting additional second melting charge continuously or in batches while discharging the second glass melts continuously.

15. The method according to claim 14, wherein the step of conducting the cooling fluid through cooling channels comprises conducting water through the cooling channels.

16. The method according to claim 14, wherein the skull layer of the first and second glass melts that forms on the aluminum nitride-containing ceramic comprises a crystallized layer.

17. The method according to claim 14, wherein the step of removing the cooled first glass melt comprises:
   separating a bottom and the side wall of the crucible from each other in a vertical direction so that the cooled first glass melt remains on the bottom;
   removing the cooled first glass melt from the bottom after separation; and
   re-assembling the bottom and the side wall of the crucible to each other.

18. The method according to claim 14, further comprising, prior to cooling the first glass melt until the first glass melt detaches from the interior of the side wall, substantially emptying the first glass melt from the crucible.

19. The method according to claim 18, wherein the first and second melting charge comprises a material selected from the group consisting of an arsenic-free and alkali-free aluminum silicate glass, a fluorophosphate glass, and a lanthanum borate glass.

* * * * *